(12) United States Patent
Takeuchi et al.

(10) Patent No.: US 9,381,689 B2
(45) Date of Patent: Jul. 5, 2016

(54) HOT RUNNER NOZZLE AND MOLD FOR FORMING MULTI-LAYER MOLDED ARTICLE USING THE SAME

(71) Applicant: Nissei Plastic Industrial Co., Ltd., Hanishina-gun, Nagano-gun (JP)

(72) Inventors: Yasuhiko Takeuchi, Nagano-ken (JP); Minoru Yamazaki, Nagano-ken (JP); Kouichi Shimizu, Nagano-ken (JP)

(73) Assignee: Nissei Plastic Industrial Co., Ltd., Hanishina-Gun (JP)

( * ) Notice: Subject to any disclaimer, the term of this patent is extended or adjusted under 35 U.S.C. 154(b) by 229 days.

(21) Appl. No.: 14/317,153

(22) Filed: Jun. 27, 2014

(65) Prior Publication Data

US 2015/0014878 A1    Jan. 15, 2015

(30) Foreign Application Priority Data

Jul. 12, 2013 (JP) .................................. 2013-146733

(51) Int. Cl.
*B29C 45/16* (2006.01)
*B29L 31/00* (2006.01)

(52) U.S. Cl.
CPC ......... *B29C 45/1642* (2013.01); *B29C 45/1607* (2013.01); *B29L 2031/7132* (2013.01)

(58) Field of Classification Search
CPC ............... B29C 2045/1612; B29C 2045/1614; B29C 45/1607; B29C 45/1642
See application file for complete search history.

(56) References Cited

U.S. PATENT DOCUMENTS

| 5,894,023 A * | 4/1999 | Schramm ............ B29C 45/1603 264/328.8 |
| 6,273,706 B1 * | 8/2001 | Gunther .............. B29C 45/2806 425/564 |
| 6,648,622 B1 * | 11/2003 | Gellert ................ B29C 45/1607 425/130 |
| 2012/0070532 A1 * | 3/2012 | Ten ..................... B29C 45/1603 425/568 |
| 2013/0207289 A1 * | 8/2013 | Babin ................. B29C 45/1603 264/40.1 |

FOREIGN PATENT DOCUMENTS

JP        1994-059672        8/1991

* cited by examiner

*Primary Examiner* — Jill Heitbrink
(74) *Attorney, Agent, or Firm* — Posternak Blankstein & Lund LLP

(57) ABSTRACT

At a filling termination stage when performing multi-layer molding by means of a hot runner nozzle, an intermediate layer in a multi-layer molded article is prevented from being formed in a shape causing the intermediate layer to enter into a sprue in a portion of a mold cavity in a mold corresponding to the sprue. The multi-layer molded article with no intermediate layer being exposed in a sprue cut portion can be therefore obtained. In this manner, a diameter of a discharge port opening and closing mechanism part for opening and closing the resin discharge ports in the shut pin is made different from a diameter of a nozzle gate opening and closing mechanism part configured of the projection for pushing out the molten resin in the nozzle gate.

13 Claims, 12 Drawing Sheets

HOT RUNNER NOZZLE AND MOLD FOR FORMING MULTI-LAYER MOLDED ARTICLE USING THE SAME

FIELD

The present invention relates to: a hot runner nozzle for producing a relatively thin molded article having a multi-layer structure, such as a cup made of a synthetic resin, by means of injection molding; a mold for forming a multi-layer molded article using the same; a method for feeding a molten resin to a mold using the same; and a method for molding multilayers using the same.

BACKGROUND

Examples of molded article made of a synthetic resin material includes those using two different kinds of resins and having a layered structure in which one of the resins is used to form surface layers of a molded article (the innermost layer and the outermost layer in the molded article) and the other one of the resins is used to form an intermediate layer of the molded article. Further included are those having a layered structure in which a resin to exhibit a desired function is used to form an intermediate layer of a molded article and layers made of a resin for an exterior of the molded article are molded to interpose the intermediate layer therebetween to form a three layer structure. Not only multi-layer molded articles having such a layered structure using two kinds of resins to form three layers but also those having a layered structure using three kinds of resins to form five layers are commonly available.

Upon molding such a molded article having a multi-layer structure according to an injection molding method, methods have been known in which molten resins from two injection cylinders may be joined at a single nozzle portion of an injection machine and the joined molten resins are injected from the injection machine for molding. If a plurality of molded articles are simultaneously molded with this method, while the joined two kinds of resins are traveling from the nozzle of the injection machine through a runner portion of a mold to reach a mold cavity, the resin for the intermediate layer may be concentrated in part of the mold cavity due to an influence of the bending runner portion. As a result, the molded article is formed in such a shape where the intermediate layer is concentrated.

In contrast to the method in which joined multiple kinds of molten resins are sent out to branched runners in a mold from a single nozzle of an injection machine and then the molten resins are sent out to each of mold cavities, there is a method using a mold associating a hot runner nozzle with each of a plurality of mold cavities and utilizing an injection molding machine having a configuration in which an injection machine for injecting a molten resin for surface layers of a molded article and an injection machine for injecting a molten resin for an intermediate layer of the molded article are connected to the mold.

According to this method, the hot runner nozzle set to correspond to each of the mold cavities has the following configuration as described in Patent Literature 1, for example. In this configuration, nozzle resin passages to reach a plurality of resin discharge ports are each arranged in a concentric annular shape as a layout in a cross sectional plane in a nozzle diameter direction. Each of the resin discharge ports faces a single shut pin hole. Molten resins sent out from the respective resin discharge ports opened in a circumferential direction of the shut pin hole are joined in the shut pin hole and the joined molten resins as they are sent out to the mold cavity from a nozzle gate. Herein the respective resin discharge ports can be opened and closed by moving a shut pin back and forth through the shut pin hole.

The molten resins are separately flown into the respective resin passages in the hot runner nozzle from the branched runner portions in the mold. After the molten resin for surface layers of a molded article and the molten resin for an intermediate layer of a molded article, which requires a separate flow in the layered structure, are separately flown within the hot runner nozzle, these molten resins are fed into the shut pin hole from the respective resin discharge ports. The joined molten resins are then sent out to the mold cavity.

CITATION LIST

Patent Literature

Patent Literature 1: Japanese Examined Patent Application Publication No. Hei. 06-059672 (JP1994-059672B2)

SUMMARY

Technical Problem

According to the molding method with which the hot runner nozzle directly faces each of the mold cavities to feed molten resins thereto as described above, the mold has a complicated configuration. Nevertheless, this molding method is advantageous in producing a good molded article without generating the aforementioned defect such that the resin portion of the intermediate layer is concentrated in part of the mold cavity.

In the molding using the hot runner nozzle, the size of the gate cannot be reduced to a level such as to prevent the filling of resins into the mold cavity. Nevertheless, in order to make the gate mark in the molded article inconspicuous or to reduce the gate sealing time, the diameter of the nozzle gate is set to be small as much as possible and the diameter of the shut pin hole through which the shut pin moves back and forth is also set to be small.

On the other hand, in the multi-layer molding using the hot runner nozzle, if such a shut pin hole has a small diameter, each of the resin discharge ports facing the shut pin hole has a small area. Therefore, the flows of a plurality of resins are easily disturbed. In view of this, setting the diameter of the shut pinhole to a size enough to maintain an appropriate feeding flow rate from each of the resin discharge ports is being considered as a countermeasure.

In the hot runner nozzle having a configuration in which the diameter of the nozzle gate is set to be smaller than that of the shut pin hole and the shut pin having a large diameter is moved back and forth to open and close the resin discharge ports, however, even if the shut pin moves forward up to the nozzle gate portion after closing all of the resin discharge ports, the shut pin cannot enter the inside of the nozzle gate. Thus, this conventional technique using the hot runner nozzle has the following disadvantages.

FIGS. 12A to 15B each show, as an example, a main part of a mold in which a hot runner nozzle having a nozzle gate according to the conventional technique is disposed. In the hot runner nozzle 1 shown in the drawings, three resin discharge ports 4, 5, and 6 each arranged in a concentric annular shape in the order from the foremost side (nozzle foremost side) face a shut pin hole 3, through which a shut pin 2 moves back and forth. Molten resins fed from the resin discharge ports 4, 5, and 6 are joined in the shut pin hole 3 and fed into a mold cavity 9 in a mold 8 through a nozzle gate 7 positioned at a tip of the shut pin hole 3.

For example, a molten resin for surface layers of a molded article sent out from one injection machine is sent out to the shut pin hole 3 through the foremost resin discharge port 4 and the rearmost resin discharge port 6. A different kind of molten resin sent out from another injection machine and having a function different from that of the resin for surface layers of a molded article is sent out to the shut pin hole 3 through the middle resin discharge port 5.

An example of an operation of the hot runner nozzle 1 will be described below. As described above, the shut pin 2 of the hot runner nozzle 1 has the function of opening and closing the resin discharge ports 4, 5, and 6 by moving back and forth through the shut pin hole 3. When the shut pin 2 moves forward up to the foremost position in the shut pin hole 3, the circumferential surface of the shut pin 2 is positioned corresponding to all of the resin discharge ports 4, 5, and 6 and thereby closes these resin discharge ports.

Next, if the shut pin 2 moves backward until a tip of the shut pin 2 slidably in contact with the shut pin hole 3 moves behind the foremost resin discharge port 4, the foremost resin discharge port 4 is opened. Consequently, the molten resin a for surface layers of a molded article is sent out to the shut pin hole 3 (see FIGS. 12A and 12B).

If the shut pin 2 further moves backward until the tip of the shut pin 2 moves behind the middle resin discharge port 5, the middle resin discharge port 5 is opened. Consequently, the molten resin b for an intermediate layer of a molded article is sent out to the shut pin hole 3 (see FIGS. 13A and 13B).

If the shut pin 2 further moves backward until the tip of the shut pin 2 moves behind the rearmost resin discharge port 6, the rearmost resin discharge port 6 is opened. Consequently, the molten resin a for surface layers of a molded article is sent out to the shut pin hole 3 (see FIGS. 14A and 14B and 15A and 15B).

Conversely, if the shut pin 2 moves forward from the position where the resin discharge ports 4, 5, and 6 are all opened, the resin discharge port 6, the resin discharge port 5, and the resin discharge port 4 are closed by the shut pin 2 in this order. Thus, the feeding of the molten resins from the discharge ports can be stopped in this order.

The filling of the molten resins is ended when the shut pin 2 moves forward up to the foremost portion in the shut pin hole 3 as described above. However, as shown in FIG. 16A, when the filling is ended, a cross sectional shape of three layers configured of two surface layers a1 and a2 each made of the molten resin a for surface layers of a molded article and an intermediate layer b1 positioned between the layers a1 and a2 and made of the molten resin b for an intermediate layer of a molded article is protruded toward the hot runner nozzle in a portion of a sprue 10 in the molded article. Thus, the molded article with a portion of the intermediate layer b1 being caused to enter into the sprue portion is produced (FIG. 16A).

When the sprue portion is cut in post-processing for the molded article or the like, the intermediate layer b1 is exposed in the cut surface (FIG. 16B). A resin for the intermediate layer and a resin for the surface layers often have poor adhesiveness to each other. In that case, the resin layer as the intermediate layer and the resin layer as the surface layer are more likely to be separated from each other.

In view of the aforementioned circumstances, a problem to be solved by the invention is to prevent an intermediate layer in a multi-layer molded article from being formed in a shape causing the intermediate layer to enter into a sprue in a portion of a mold cavity corresponding to the sprue at a filling termination phase when performing multi-layer molding with a hot runner nozzle. Accordingly, it is an object of the present invention to obtain a multi-layer molded article with no intermediate layer being exposed in the cut portion when the sprue is cut.

Solution to Problem

First Aspect of Invention

The present invention has been made in view of the aforementioned problem. In order to solve the aforementioned problem, the first aspect of the invention provides a hot runner nozzle to be attached to a mold for forming a molded article having a layered structure. The hot runner nozzle can include a nozzle gate, a shut pin hole, a shut pin moving back and forth through the shut pin hole, and a plurality of resin discharge ports arranged in a length direction of the shut pin hole so that the plurality of resin discharge ports face the shut pin hole, molten resins from the resin discharge ports being joined in the shut pin hole, and the resin discharge ports being able to be opened and closed by the shut pin. In this hot runner nozzle, the nozzle gate has a diameter smaller than a diameter of the shut pin hole. The shut pin includes a projection provided at a tip of the shut pin so as to push out the molten resin in the nozzle gate toward a mold cavity in the mold when the shut pin moves forward to close all of the resin discharge ports. The shut pin further include a discharge port opening and closing mechanism part for opening and closing the resin discharge ports and a nozzle gate opening and closing mechanism part configured of the projection for pushing out the molten resin in the nozzle gate, wherein the discharge port opening and closing mechanism part and the nozzle gate opening and closing mechanism part have respective different diameters.

Second Aspect of Invention

The first aspect of the invention preferably has a configuration such that the resin discharge ports corresponding to which a circumferential surface of the shut pin is positioned are closed by the shut pin, and when the shut pin moves backward so that the resin discharge port is positioned before the tip of the shut pin, the resin discharge port positioned before the tip of the shut pin is opened to be capable of sending out the molten resin.

Third Aspect of Invention

In the first or second aspect of the invention described above, the hot runner nozzle can include nozzle resin passages to reach the plurality of respective resin discharge ports, the nozzle resin passages each being preferably arranged in a concentric annular shape in across sectional plane in a nozzle diameter direction, and each of the plurality of resin discharge ports is preferably opened in a circumferential direction of the shut pin hole.

Fourth Aspect of Invention

The fourth aspect of the invention provides a mold, provided with the hot runner nozzle according to any one of the first to third aspects, for forming a molded article having a layered structure with molten resins fed from the hot runner nozzle. The shut pin is switchable among three shut pin opening and closing states including: a state in which the shut pin is positioned corresponding to the resin discharge ports other than a foremost resin discharge port to open only the foremost resin discharge port; a state in which the shut pin is positioned behind a rearmost resin discharge port to open all of the resin discharge ports; and a totally-closed state in which the shut pin closes all of the resin discharge ports. The aforementioned problem is solved by providing this mold for forming a multi-layer molded article.

Fifth Aspect of Invention

The fifth aspect of the invention provides a mold, provided with the hot runner nozzle according to any one of the first to third aspects, for forming a molded article having a layered structure with molten resins fed from the hot runner nozzle. The shut pin is switchable among four shut pin opening and closing states including: a state in which the shut pin is positioned corresponding to the resin discharge ports other than a foremost resin discharge port to open only the foremost resin discharge port; a state in which the shut pin is positioned corresponding to a rearmost resin discharge port to close only the rearmost resin discharge port and open the resin discharge ports other than the rearmost resin discharge port; a state in which the shut pin is positioned behind the rearmost resin discharge port to open all of the resin discharge ports; and a totally-closed state in which the shut pin closes all of the resin discharge ports. The aforementioned problem is solved by providing this mold for forming a multi-layer molded article.

Sixth Aspect of Invention

The sixth aspect of the invention provides a method for feeding molten resins to a mold, the method including: attaching, to the mold for forming a multi-layer molded article according to the fourth or fifth aspect, an injection machine for feeding a molten resin to a runner for a molten resin for a surface layer of the molded article in the mold and an injection machine for feeding a molten resin to a runner for a molten resin for an intermediate layer of the molded article in the mold; and switching among the shut pin opening and closing states upon feeding the molten resins to the mold on the basis of a screw reached position or an injection time in the injection machine for feeding the molten resin for a surface layer of the molded article and the injection machine for feeding the molten resin for an intermediate layer of the molded article. The aforementioned problem is solved by providing this method for feeding molten resins to a mold.

Seventh Aspect of Invention

The seventh aspect of the invention provides a method for feeding molten resins to a mold, the method including: upon feeding molten resins to a mold, provided with the hot runner nozzle according to any one of the first to third aspects, for forming a molded article having a layered structure with the molten resins fed from the hot runner nozzle, using the foremost resin discharge port and the rearmost resin discharge port in the hot runner nozzle as resin discharge ports into which the same molten resin is separated and fed and using the middle resin discharge port as a resin discharge port into which a molten resin of a kind different from the molten resin fed into the foremost resin discharge port and the rearmost resin discharge port is fed; setting a resin flow rate of the same molten resin to be separated into the foremost resin discharge port to be different from a resin flow rate of the same molten resin to be separated into the rearmost resin discharge port by adjusting runner bores after the molten resin is separated or throttles; and feeding the same molten resin to the mold cavity with the resin flow rate from the foremost resin discharge port into the mold cavity in the mold and the resin flow rate from the rearmost resin discharge port into the mold cavity being different from each other. The aforementioned problem is solved by providing this method for feeding molten resins to a mold.

Eighth Aspect of Invention

The eighth aspect of the invention provides a method for feeding molten resins to a mold, the method including: upon feeding molten resins to a mold, provided with the hot runner nozzle according to any one of the first to third aspects, for forming a molded article having a layered structure with the molten resins fed from the hot runner nozzle, using the resin discharge ports of the hot runner nozzle as resin discharge ports into which the molten resins are fed from independent injection machines; and controlling resin flow rates of the molten resins to be fed into the resin discharge ports respectively by the injection machines corresponding to the resin discharge ports. The aforementioned problem is solved by providing this method for feeding molten resins to a mold.

Ninth Aspect of Invention

The ninth aspect of the invention provides a method for feeding molten resins to a mold, the method including: upon feeding molten resins to a mold, provided with the hot runner nozzle according to any one of the first to third aspects, for forming a molded article having a layered structure with the molten resins fed from the hot runner nozzle, performing a final stage in forming a molded article by feeding the molten resin only from the foremost resin discharge port. The aforementioned problem is solved by providing this method for feeding molten resins to a mold.

Tenth Aspect of Invention

The tenth aspect of the invention provides a method for feeding molten resins to a mold, the method including: attaching, to a mold, provided with the hot runner nozzle according to any one of the first to third aspects, for forming a multi-layer molded article, an injection machine for feeding a molten resin to a runner for a molten resin for a surface layer of the molded article in the mold and an injection machine for feeding a molten resin to a runner for a molten resin for an intermediate layer of the molded article in the mold; upon feeding the molten resins to the mold, sending out the molten resin from the foremost resin discharge port while keeping all of the resin discharge ports or the foremost resin discharge port and the resin discharge port for sending out the molten resin for an intermediate layer of the molded article in an opened state in a final stage in a process of forming a molded article and performing screw depressurization in the injection machine corresponding to the resin discharge port for the molten resin for an intermediate layer of the molded article so as to push the molten resin fed into the shut pin hole from the resin discharge port other than the resin discharge port for the molten resin for an intermediate layer of the molded article into the resin discharge port for the molten resin for an intermediate layer of the molded article; ending the process of forming a molded article after the pushing-in; and closing the resin discharge port for the molten resin for an intermediate layer of the molded article by the shut pin with the molten resin fed into the shut pin hole from the resin discharge port other than the resin discharge port for the molten resin for an intermediate layer of the molded article being pushed thereinto until a next process of forming a molded article is started. The aforementioned problem is solved by providing this method for feeding molten resins to a mold.

Eleventh Aspect of Invention

The eleventh aspect of the invention provides a method for molding multilayers, the method including: attaching, to a mold, provided with the hot runner nozzle according to any one of the first to third aspects, for forming a multi-layer molded article, an injection machine for feeding a molten resin to a runner for a molten resin for a surface layer of the molded article in the mold and an injection machine for feeding a molten resin to a runner for a molten resin for an intermediate layer of the molded article in the mold; upon forming a molded article by feeding the molten resins to the mold, closing all of the resin discharge ports in the hot runner nozzle by the shut pin after performing a pressure keeping operation in the injection machines for feeding the molten resins to the resin discharge ports; performing a measuring step in each of the injection machines; and causing screws in all of the injection machines to move forward with a predetermined pressure after the measuring step is ended and thereafter performing reverse depressurization to keep a pressure in each of the runners for the molten resins from the injection machines to the hot runner nozzle constant. The aforementioned problem is solved by providing this method for molding multilayers.

Advantageous Effects of Invention

Advantageous Effects of First Aspect of Invention

According to the first aspect of the invention, the projection is provided at the tip of the shut pin so as to enter the nozzle gate when the shut pin moves forward to close all of the resin discharge ports and thereby push out the molten resin in the nozzle gate toward the mold cavity in the mold. Thus, the molded article is prevented from being formed in the shape such that the intermediate layer thereof is caused to enter into the sprue portion. Therefore, no intermediate layer is exposed when the sprue portion is cut in the post-processing for the molded article. Thus, the defect such that the intermediate layer and the surface layer on the side where the sprue is cut are separated from each other in the cut portion is eliminated.

Moreover, the shut pinhole can have a large diameter while keeping the diameter of the nozzle gate small. Thus, the flow of the molten resins fed from the resin discharge ports facing the shut pin hole is not disturbed, thereby making it possible to send out each of the molten resins toward the nozzle gate with a stable flow. Furthermore, the nozzle gate or the sprue (direct gate) can be elongated with a small diameter. As a result of this, a distance between the mold cavity and the hot runner nozzle can be prolonged, thereby obtaining an advantageous effect of making the temperature slope at the tip of the hot runner nozzle gentle.

Advantageous Effects of Second Aspect of Invention

FIGS. 17A and 17B each schematically illustrate a conventional hot runner nozzle 1. According to the conventional hot runner nozzle 1, in a case of multi-layer molding as shown in FIG. 17A, one resin discharge port n3 among a plurality of resin discharge ports n1, n2, and n3 is disposed at a position corresponding to a base end side 2a of a shut pin 2 in a shut pin hole 3. Also when forming a single-layer molded article as shown in FIG. 17B, a single resin discharge port n4 is disposed at a position corresponding to the base end side 2a of the shut pin 2. A molten resin from the resin discharge port n3 or n4 disposed at the base end side 2a of the shut pin 2 is sent out to a tip side 2b of the shut pin 2 while moving along the shut pin 2.

The resin discharge port n3 or n4 disposed at the position corresponding to the base end side of the shut pin is not opened in such a manner that the discharge port surrounds the shut pin. A molten resin is therefore fed from only an opening at a single location. Due to a pressure of the molten resin fed from the resin discharge port n3 or n4, the shut pin may disadvantageously slant. If the shut pin is slanted, the molten resin flows while leaning to a portion around the shut pin. Consequently, the molten resin is not fed into the mold cavity in the mold with an even flow. Note that in FIGS. 17A and 17B, a thicker arrow and a thinner arrow represent the magnitude relationship between the molten resin flows in the shut pin hole.

In contrast, the molten resin is not directly fed around the shut pin according to the second aspect of the invention. Thus, the slanting of the shut pin can be prevented, thereby obtaining an advantageous effect of feeding the molten resin evenly to the mold cavity in the mold.

Advantageous Effects of Third Aspect of Invention

According to the third aspect of the invention, each of the nozzle resin passages to reach the resin discharge ports is disposed in the concentric annular shape in the cross sectional plane in the nozzle diameter direction. Thus, the hot runner nozzle can be configured compactly.

Advantageous Effects of Fourth Aspect of Invention

According to the fourth aspect of the invention, the resin discharge port for the molten resin to be fed into the mold cavity in the mold is opened whereas the resin discharge port for the molten resin not to be fed is closed. Thus, unnecessary inflow and backflow of the molten resin not to be fed into the resin discharge port can be reliably prevented.

When the feeding of the molten resin into the shut pin hole and the mold cavity in the mold is stopped, responsiveness to stop the feeding of the molten resin into the shut pin hole and the mold cavity is higher when closing the resin discharge port by the shut pin than when stopping the operation of the supplier for feeding the molten resin to the resin discharge port, for example, the screw of the injection machine.

Moreover, while closing the resin discharge port by the shut pin, a resin pressure can be applied from the supplier (for example, the injection machine) for feeding the molten resin to this resin discharge port. If the resin discharge port is opened after the application of this resin pressure, the inflow response of the molten resin into the shut pin hole and the mold cavity from the resin discharge port can be enhanced.

Advantageous Effects of Fifth Aspect of Invention

According to the fifth aspect of the invention, the resin discharge port for the molten resin to be fed into the mold cavity in the mold is opened whereas the resin discharge port for the molten resin not to be fed is closed. Thus, unnecessary inflow and backflow of the molten resin not to be fed into the resin discharge port can be reliably prevented.

When the feeding of the molten resin into the shut pin hole and the mold cavity in the mold is stopped, responsiveness to stop the feeding of the molten resin into the shut pin hole and the mold cavity is higher when closing the resin discharge port by the shut pin than when stopping the operation of the supplier for feeding the molten resin to the resin discharge port, for example, the screw of the injection machine.

Moreover, while closing the resin discharge port by the shut pin, a resin pressure can be applied from the supplier (for example, the injection machine) for feeding the molten resin to this resin discharge port. If the resin discharge port is opened after the application of this resin pressure, the inflow response of the molten resin into the shut pin hole and the mold cavity from the resin discharge port can be enhanced.

Advantageous Effects of Sixth Aspect of Invention

According to the sixth aspect of the invention, the shut pin opening and closing states are switched from one to another on the basis of the screw reached position or the injection time in the injection machine for feeding the molten resin for a surface layer of the molded article and the injection machine for feeding the molten resin for an intermediate layer of the molded article. Thus, unnecessary inflow of the resin into the resin discharge port for the molten resin not to be fed can be reliably prevented. Moreover, the arrangement or length of the molten resin for an intermediate layer of the molded article with respect to the molten resin for a surface layer of the molded article can be adjusted.

When the feeding of the molten resin into the shut pin hole and the mold cavity in the mold is stopped by stopping the operation of the screw of the injection machine, the resin discharge port can be closed by the shut pin on the basis of the screw reached position or the injection time in the injection machine. Responsiveness to stop the feeding of the molten resin into the shut pin hole and the mold cavity is higher when closing the resin discharge port by the shut pin than when stopping the operation of the screw of the injection machine for feeding the molten resin into the resin discharge port.

Conversely, when the screw of the injection machine starts an injection operation, a resin pressure can be applied from the injection machine for feeding the molten resin into the resin discharge port with the resin discharge port being closed by the shut pin on the basis of the screw reached position or the injection time in this injection machine. If the resin discharge port is opened after the application of this resin pressure, the inflow response of the molten resin into the shut pin hole and the mold cavity from the resin discharge port can be enhanced.

Advantageous Effects of Seventh Aspect of Invention

According to the seventh aspect of the invention, a thickness distribution between one of the surface layer resins (the outer side of the molded article, for example) and the other one of the surface layer resins (the inner side of the molded article, for example) in the thickness of the molded article can be controlled.

Advantageous Effects of Eighth Aspect of Invention

According to the eighth aspect of the invention, a thickness distribution of the resin of each layer in the thickness of the molded article can be controlled.

Advantageous Effects of Ninth Aspect of Invention

The ninth aspect of the invention can serve as assistance for the pushing-in of the molten resin by the projection, thereby making it possible to prevent insufficient pushing-in of the intermediate layer in the sprue portion more reliably. Thus, no intermediate layer is exposed when the sprue portion is cut, thereby obtaining an advantageous effect of forming a molded article in which no separation occurs in the cut portion.

Advantageous Effects of Tenth Aspect of Invention

According to the tenth aspect of the invention, even when a foamable material or a low-viscosity material with which it is difficult to close the resin discharge port in the shut pin hole (it is more likely to leak into the shut pin hole) is used as the molten resin for an intermediate layer of the molded article, the molten resin from the other resin discharge port is caused to flow into the resin discharge port for the molten resin for an intermediate layer of the molded article, thereby pushing-in (pushing-in in the direction opposite to the feeding direction) and holding the molten resin for an intermediate layer of the molded article. Thus, there is provided an advantageous effect of suppressing an unnecessary inflow phenomenon of the intermediate layer molten resin.

Advantageous Effects of Eleventh Aspect of Invention

According to the eleventh aspect of the invention, a resin pressure distribution generated in the manifold on the hot runner nozzle side or in the portions to reach the respective resin discharge ports in the hot runner nozzle is stabilized when the measuring step is ended. Accordingly, when the shut pin is moved backward to start the feeding of the molten resins by the respective injection machines, the molten resins stabilized beforehand are fed into the shut pin hole. Thus, there is obtained an advantageous effect of reducing variations when the molten resins fed from the gates of the respective injection machines themselves are caused to enter into the shut pin hole.

BRIEF DESCRIPTION OF DRAWINGS

FIG. 14A being an explanatory drawing illustrating the mold in a state where all of the resin discharge ports are opened, FIG. 14B being an explanatory drawing illustrating, in an enlarged manner, the state where all of the resin discharge ports are opened;

DETAILED DESCRIPTION OF THE INVENTION

Figure 1:
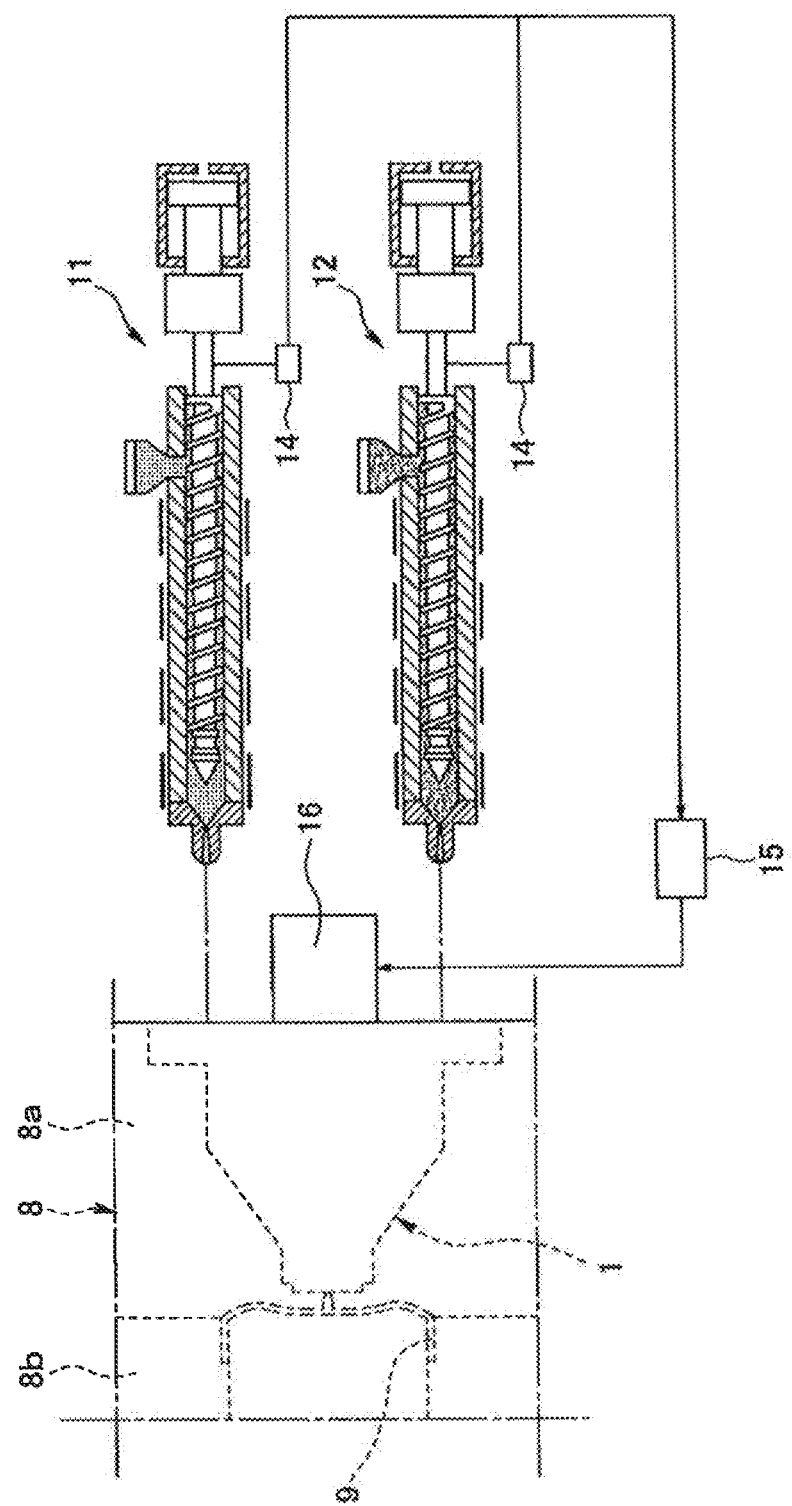
FIG. 1 is an explanatory drawing schematically illustrating an example of an injection molding machine in which injection machines are connected to a mold according to the present invention.

The present invention will now be described in detail below on the basis of embodiments illustrated in FIGS. 1 to 11. Note that components identical with those in the conventional technique illustrated in FIGS. 12A to 15B will be denoted by the same reference numerals and the description thereof will be omitted. In a mold 8, a mold cavity 9 for forming a cup-shaped molded article is formed between a fixed mold 8a and a movable mold 8b as shown in FIG. 1. A hot runner nozzle 1 according to the present invention is attached to the fixed mold 8a in the mold 8. The hot runner nozzle 1 is disposed in such a manner that a tip portion of the nozzle 1 directly faces the mold cavity 9.

Figure 16A:
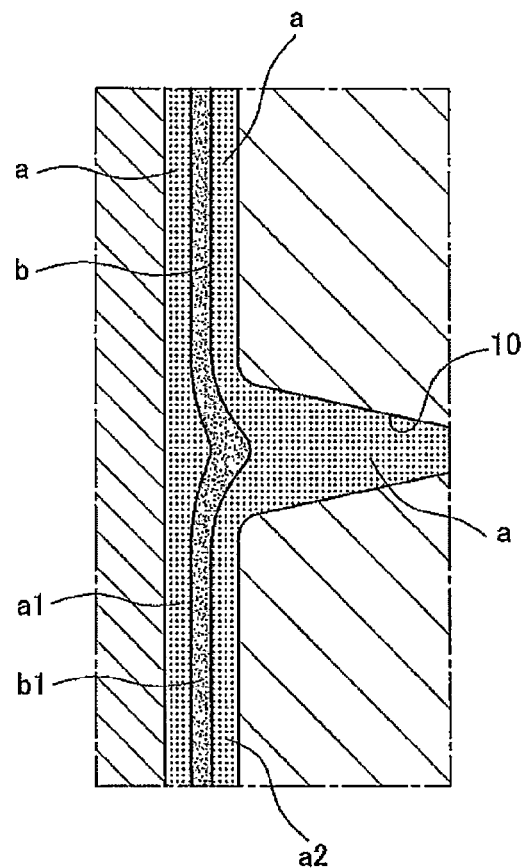
FIGS. 16A and 16B each illustrate a cross section of a molded article produced with the conventional technique, FIG. 16A being an explanatory drawing illustrating a sprue portion when forming a molded article in a mold, FIG. 16B being an explanatory drawing illustrating a state after the sprue is cut.
Figure 16B:
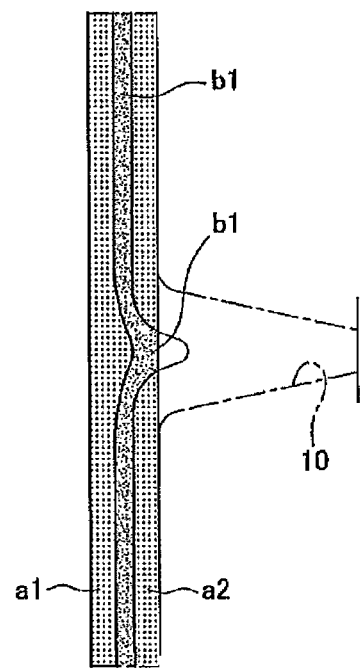
Figure 17A:
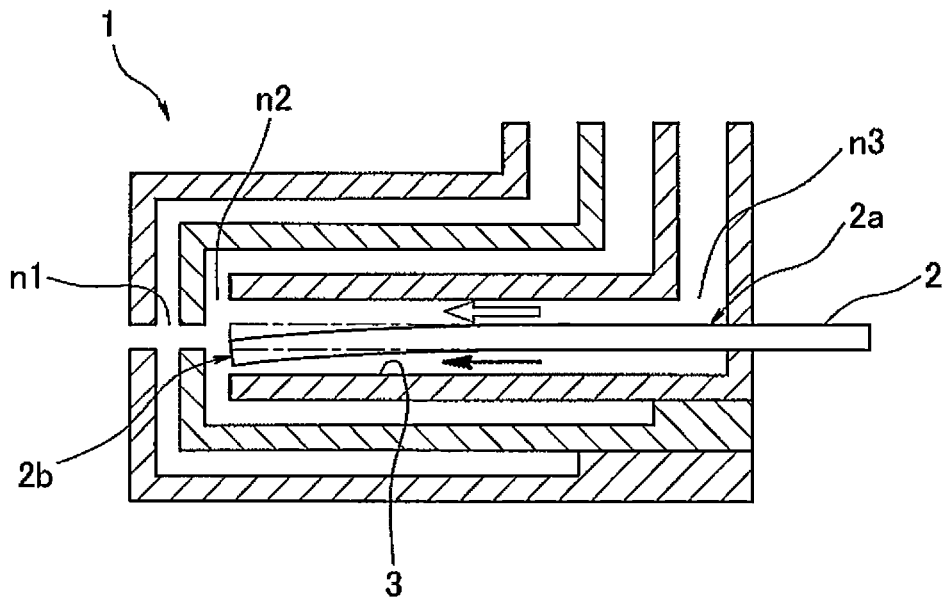
FIGS. 17A and 17B schematically illustrate conventional hot runner nozzles, FIG. 17A being an explanatory drawing illustrating a hot runner nozzle for multi-layer molding, FIG. 17B being an explanatory drawing illustrating a hot runner nozzle for single-layer molding.
Figure 17B:
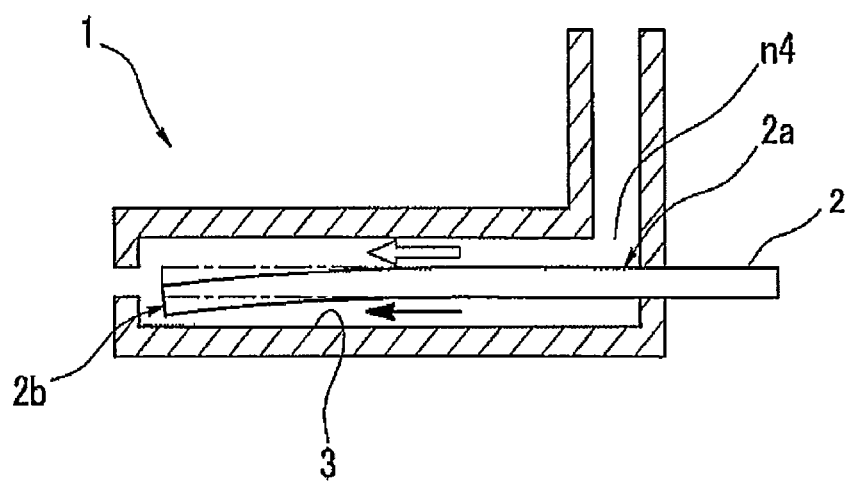

Two injection machines 11 and 12 are connected to the mold 8. A molten resin is fed toward the hot runner nozzle 1 attached to the fixed mold 8a from each of the injection machines 11 and 12. The two injection machines 11 and 12 are connected to the mold 8 with the hot runner nozzle 1 being attached thereto so as to configure an injection molding machine for injection-molding a molded article having a three-layer structure (see a1, b1, and a2 in FIG. 16A) configured with the use of two kinds of resins as a whole.

Figure 2:
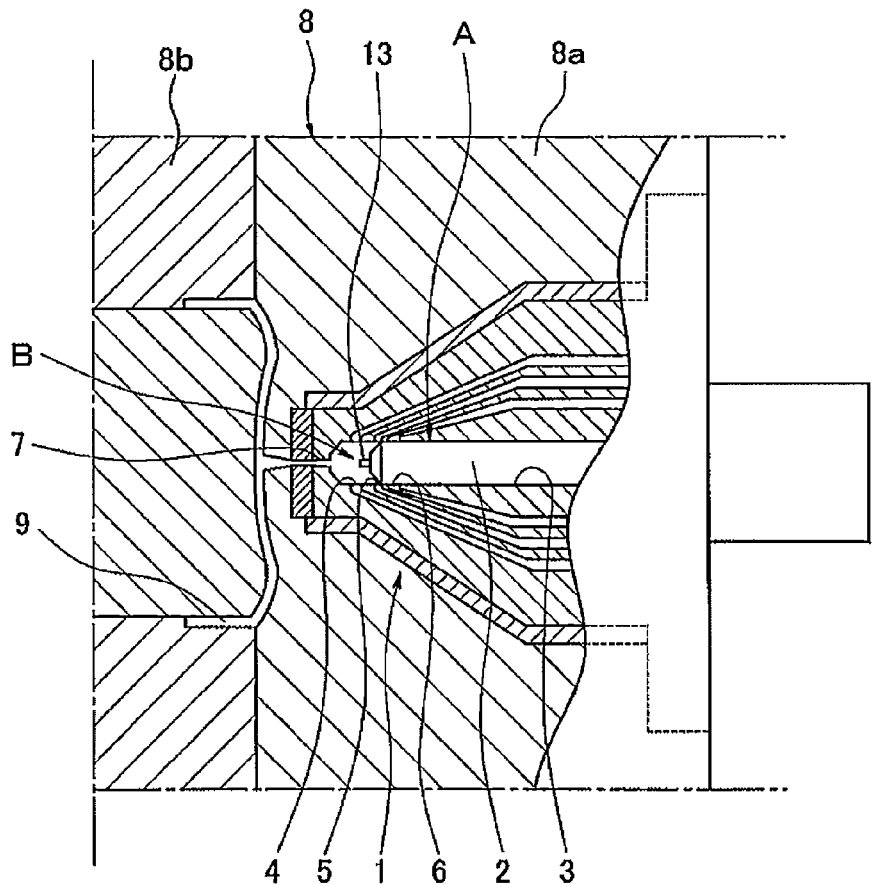
FIG. 2 is an explanatory drawing illustrating a cross section of an example of a mold to which a hot runner nozzle according to the present invention is attached.

The basic configuration of the hot runner nozzle 1 is the same as that described above with reference to FIGS. 12A to 15B. As shown in FIGS. 1 and 2, as the foremost resin discharge port (closest to the nozzle tip), a resin discharge port 4 faces a shut pin hole 3 through which a shut pin 2 moves back and forth. A resin discharge port 6 faces the shut pin hole 3 as the rearmost resin discharge port. A resin discharge port 5 faces the shut pin hole 3 as the middle resin discharge port positioned between the resin discharge port 4 and the resin discharge port 6. The resin discharge port 4 feeds, into the shut pin hole 3, a molten resin a for a surface layer of the molded article to be spread along a surface of the mold cavity 9 on the hot runner nozzle side (product surface on the mold cavity side). The resin discharge port 6 feeds, into the shut pin hole 3, the molten resin a for a surface layer of the molded article to be spread along a surface of the mold cavity 9 opposite to the hot runner nozzle side (product surface on the mold core side). The resin discharge port 5 feeds, into the shut pinhole 3, a molten resin b for an intermediate layer of the molded article to be spread while being interposed between the above-described two layers of the molten resin a for a surface layer of the molded article.

In the present hot runner nozzle 1, the diameter of the shut pin hole 3 and the diameter of a nozzle gate 7 positioned at a tip of the nozzle 1 are different from each other. As shown in FIG. 2, the shut pin hole 3 is configured to have a large diameter and the diameter of the nozzle gate 7 is set to be smaller than the diameter of the shut pin hole 3. A projection 13 is provided at a tip of the shut pin 2 that moves back and forth through the shut pin hole 3 so as to correspond to the nozzle gate 7. The projection 13 is provided so as to enter the nozzle gate when the shut pin moves forward to close all of the resin discharge ports and thereby push out the molten resin in the nozzle gate toward the mold cavity 9. Thus, in the shut pin 2, the diameter of a discharge port opening and closing mechanism part A for opening and closing the resin discharge ports 4, 5, and 6 is different from the diameter of a nozzle gate opening and closing mechanism part B configured of the projection 13 for pushing out the molten resin in the nozzle gate.

An exemplary operation of the present hot runner nozzle will now be described below.

Figure 3:
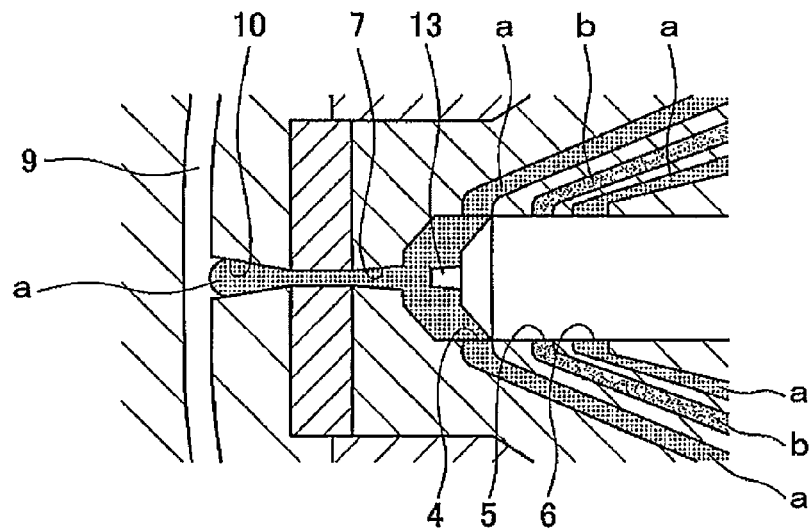
FIG. 3 is an explanatory drawing illustrating a cross section of an example of a hot runner nozzle according to the present invention with a foremost resin discharge port being opened.

(1) When the shut pin 2 closing the foremost resin discharge port 4 moves backward (to the right in the figure) until a front portion of the shut pin 2 slidably in contact with an inner surface of the shut pin hole 3 moves behind the foremost resin discharge port 4 to open the resin discharge port 4, the molten resin a for a surface layer of the molded article is fed into a portion in front of the shut pin 2 in the shut pin hole 3 from the foremost resin discharge port 4. This molten resin a for a surface layer of the molded article is fed into the mold cavity 9 from the shut pin hole 3 through the nozzle gate 7 and a sprue (direct gate) 10 of the mold 8 (FIG. 3).

Figure 4:
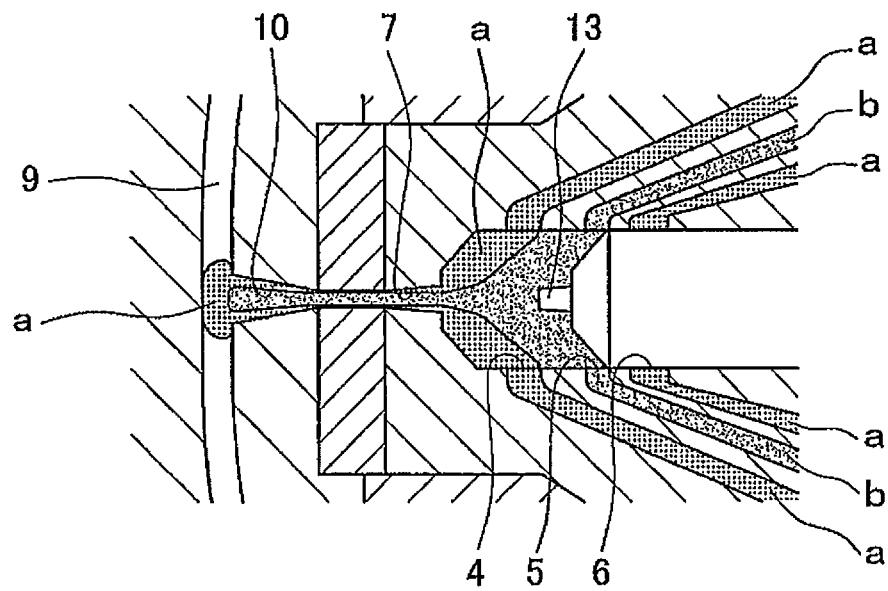
FIG. 4 is an explanatory drawing illustrating a cross section of the example of the hot runner nozzle according to the present invention with the foremost resin discharge port and a middle resin discharge port being opened.

(2) Next, when the shut pin 2 closing the middle resin discharge port 5 further moves backward until the front portion of the shut pin 2 moves behind the middle resin discharge port 5 to open the middle resin discharge port 5, the molten resin b for an intermediate layer of the molded article is fed into a portion in front of the shut pin 2 in the shut pin hole 3 from the middle resin discharge port 5. This molten resin b for an intermediate layer of the molded article is fed into the mold cavity 9 from the shut pin hole 3 through the nozzle gate 7 and the sprue 10 of the mold 8 together with the molten resin a for a surface layer of the molded article being fed from the foremost resin discharge port 4 (FIG. 4).

Figure 5:
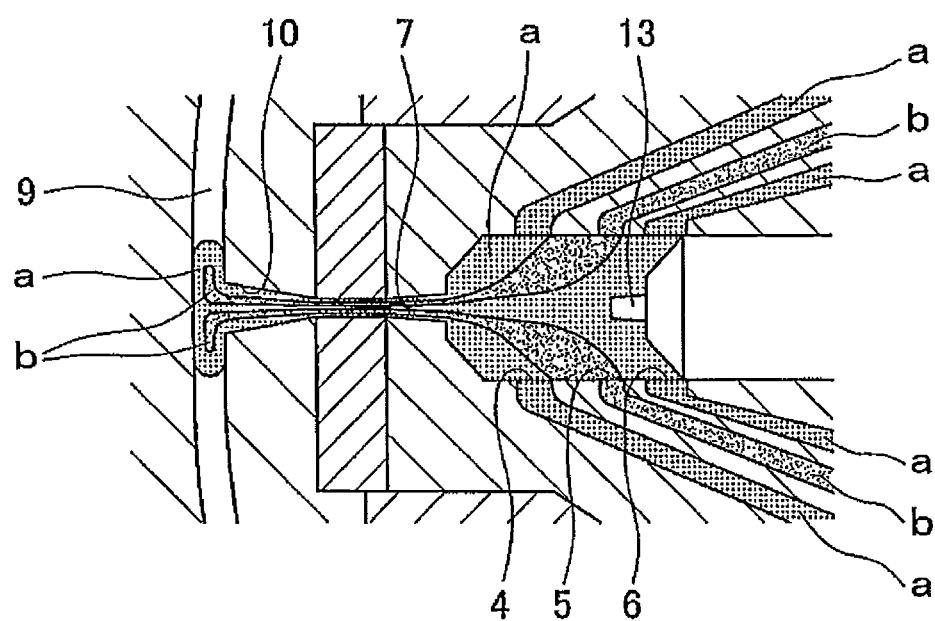
FIG. 5 is an explanatory drawing illustrating a cross section of the exemplary hot runner nozzle according to the present invention with all of the resin discharge ports being opened.
Figure 6:
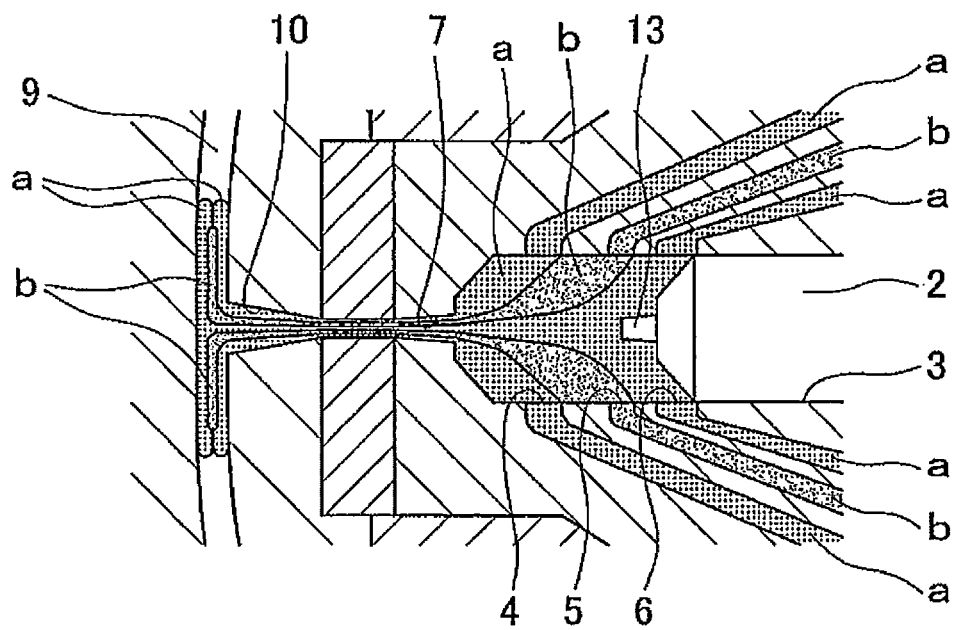
FIG. 6 is an explanatory cross-sectional view illustrating a state in which all of the resin discharge ports are opened and two kinds of resins are being spread as three layers in a mold cavity.

(3) Next, when the shut pin 2 closing the rearmost resin discharge port 6 further moves backward until the front portion of the shut pin 2 moves behind the rearmost resin discharge port 6 to open the rearmost resin discharge port 6, the molten resin a for a surface layer of the molded article is fed into a portion in front of the shut pin 2 in the shut pin hole 3 from the rearmost resin discharge port 6. This molten resin a for a surface layer of the molded article fed from the rearmost resin discharge port 6 is fed into the mold cavity 9 from the shut pin hole 3 through the nozzle gate 7 and the sprue 10 of the mold 8 together with the molten resin a for a surface layer of the molded article being fed from the foremost resin discharge port 4 and the molten resin b for an intermediate layer of the molded article being fed from the middle resin discharge port 5 (FIGS. 5 and 6).

Figure 7:
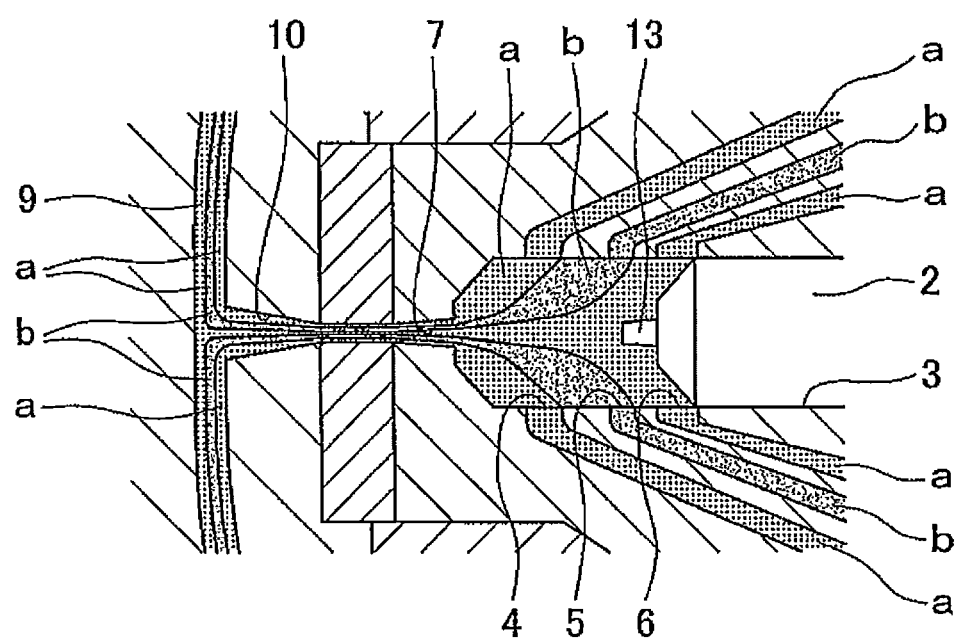
FIG. 7 is an explanatory cross-sectional view illustrating a state in which all of the resin discharge ports are opened and the two kinds of resins are filled as three layers.

Once the molten resin a for a surface layer of the molded article from the rearmost resin discharge port 6 reaches the mold cavity 9, this molten resin a for a surface layer of the molded article starts spreading along the product surface on the mold core side (left side in the figure). The molten resin a for a surface layer of the molded article exited from the foremost resin discharge port 4 spreads along the product surface on the mold cavity side (right side in the figure). The molten resin b for an intermediate layer of the molded article is interposed as a layer between the two layers of the same molten resin a for a surface layer of the molded article. These resins spread in the mold cavity 9 while maintaining this three-layer state (FIG. 7).

Figure 8:
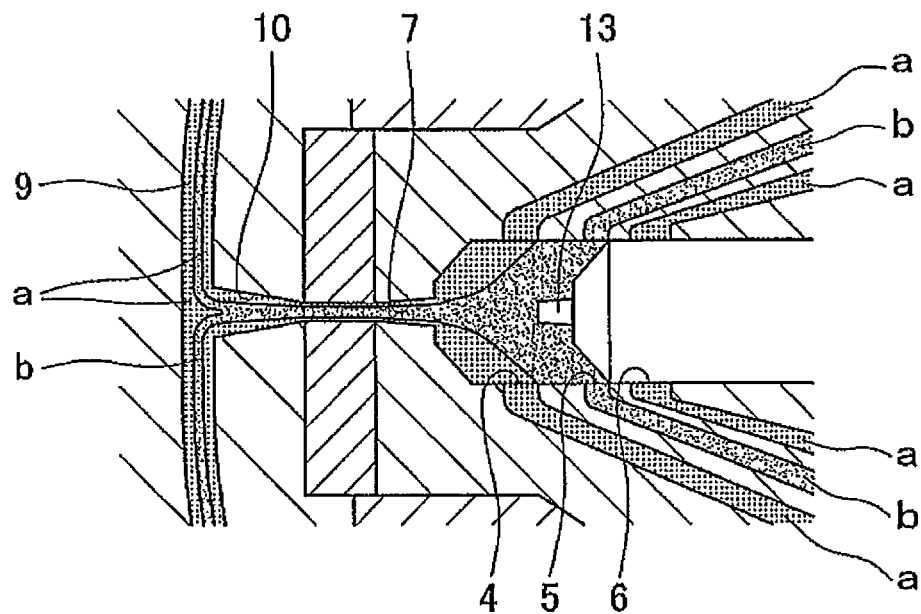
FIG. 8 is an explanatory cross-sectional view illustrating a state in which a shut pin is moved forward to close the rearmost resin discharge port.

(4) During a termination stage in the feeding of the resins into the mold cavity 9, the shut pin 2 first moves forward to close the rearmost resin discharge port 6. The feeding of the molten resin a for a surface layer of the molded article for forming the layer along the product surface on the mold core side is thereby stopped. At this point in time, the foremost resin discharge port 4 and the middle resin discharge port 5 are still opened. Therefore, these resin discharge ports 4 and 5 are in a state capable of feeding the molten resin a for a surface layer of the molded article and the molten resin b for an intermediate layer of the molded article, respectively, into the shut pin hole 3 (FIG. 8).

Figure 9:
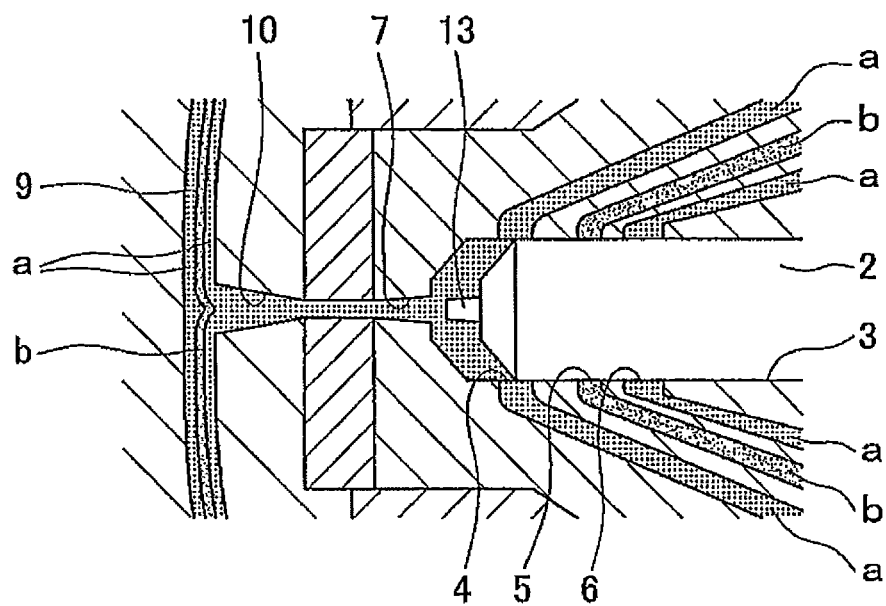
FIG. 9 is an explanatory cross-sectional view illustrating a state in which the shut pin is moved forward to close the rearmost resin discharge port and the middle resin discharge port.

(5) The shut pin 2 further moves forward to close the middle resin discharge port 5. The feeding of the molten resin b for an intermediate layer of the molded article for forming the molded article intermediate layer is thereby stopped. At this point in time, the foremost resin discharge port 4 is opened. Therefore, the resin discharge port 4 is in a state capable of feeding the molten resin a for a surface layer of the molded article into the shut pin hole 3 (FIG. 9).

Figure 10:
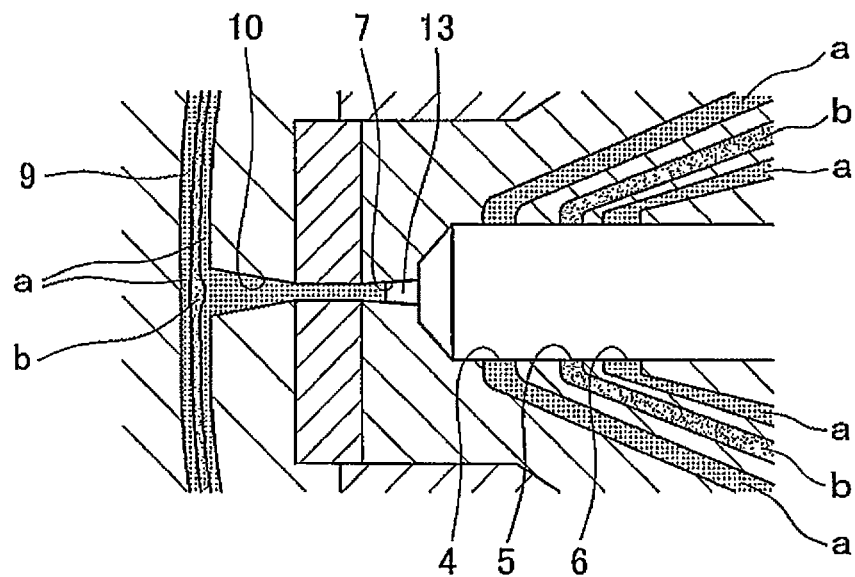
FIG. 10 is an explanatory cross-sectional view illustrating a state in which all of the resin discharge ports are closed and a projection is caused to enter into a nozzle gate.

(6) The shut pin 2 further moves forward up to the forefront of the shut pin hole 3 to close the foremost resin discharge port 4. The feeding of the molten resin a for a surface layer of the molded article to be spread along the product surface on the mold cavity side is thereby stopped. All of the resin discharge ports 4, 5, and 6 are now closed (FIG. 10).

The projection 13 capable of entering the nozzle gate 7 is provided at the tip of the shut pin 2. Therefore, when the shut pin 2 moves forward up to the forefront of the shut pin hole 3 to close all of the resin discharge ports 4, 5, and 6 as described above, the projection 13 enters the nozzle gate 7. In the present hot runner nozzle 1, the projection 13 is provided so that the entering of the projection 13 into the nozzle gate 7 pushes out the molten resin a for a surface layer of the molded article present in the nozzle gate 7 toward the mold cavity 9 (see FIG. 10).

Thus, even if the molded article intermediate layer made of the molten resin b for an intermediate layer of the molded article has a cross sectional shape protruding toward the nozzle gate 7 in a portion of the sprue 10 in the mold 8 at a point in time after the resin discharge ports 4, 5, and 6 are all closed and before the projection 13 enters the nozzle gate 7, the pushing-in of the molten resin a for a surface layer of the molded article in the nozzle gate 7 by the projection 13 presses down the portion of the intermediate layer corresponding to the sprue. As a result of this, the layers are laminated with respective appropriate layer thicknesses. Thus, a defect such that the intermediate layer is exposed at the cut surface when the sprue is cut is prevented from occurring.

Operations of Injection Machines and Opening and Closing Switching by Shut Pin

As described above, a state in which only the foremost resin discharge port 4 is opened, a state in which the foremost and middle resin discharge ports 4 and 5 are opened, and a state in which all of the resin discharge ports 4, 5, and 6 are opened are switched from one to another by the shut pin 2. Such switching by means of the shut pin 2 is preferably performed in association with operations of the injection machines 11 and 12.

In view of this, according to the present injection molding machine configured by connecting, to the mold 8, the injection machine 11 for sending out the molten resin for a surface layer of the molded article and the injection machine 12 for sending out the molten resin for an intermediate layer of the molded article, a controller 15 may receive outputs from detecting parts 14 for detecting screw reached positions or injection times in the injection machine 11 and the injection machine 12, respectively, and the controller 15 may cause a driving part 16 for moving the shut pin 2 back and forth to operate so as to control switching timing among the discharge port opening and closing states by means of the shut pin 2 (see FIG. 1).

Flow Rate Adjustment after Molded Article Surface Layer Molten Resin is Separated According to the hot runner nozzle 1, the molten resin a for a surface layer of the molded article to be spread along the product surface on the mold cavity side is sent out into the mold cavity 9 from the foremost resin discharge port 4 and the molten resin a for a surface layer of the molded article to be spread along the product surface on the mold core side is sent out into the mold cavity 9 from the rearmost resin discharge port 6. The molten resin a for a surface layer of the molded article sent out from the resin discharge port 4 and that sent out from the resin discharge port 6 are the same molten resin. This molten resin for a surface layer of the molded article is caused to enter into the mold 8 from the single injection machine 11 (see FIGS. 6 and 7). Flow passages are formed by bifurcating a runner before reaching the resin discharge port 4 and the resin discharge port 6. Thus, the same molten resin a for a surface layer of the molded article is separated and fed into the resin discharge port 4 and the resin discharge port 6.

According to the present invention, a resin flow rate is adjusted in each of the flow passages obtained by bifurcating the runner in the mold 8. A resin flow rate into the foremost resin discharge port 4 is set to be different from a resin flow rate into the rearmost resin discharge port 6. Thus, the molten resins a and a for a surface layer of the molded article, which are the same molten resin, are fed into the mold cavity 9 with a resin flow rate from the foremost resin discharge port 4 and a resin flow rate from the rearmost resin discharge port 6 being different from each other.

As a result of this, a thickness distribution between one and the other of the surface layer resins in the thickness of the molded article can be controlled. This is advantageous in adjusting the position of the intermediate layer in the laminated direction of the three layers. The flow rate of the molten resin for a surface layer of the molded article can be adjusted in each of the flow passages obtained by bifurcating the runner by adjusting the bore of the flow passage or incorporating a throttle device, for example.

Flow Rate Adjustment of Each Molten Resin

In the above-described embodiment, the two injection machines 11 and 12 are connected to the mold 8 so as to configure the injection molding machine for forming a molded article having a three-layer structure configured with the use of two kinds of resins. However, the present invention for feeding molten resins to the mold 8 for forming a molded article is not limited to the configuration in which the two injection machines 11 and 12 are connected to the mold 8. Instead of bifurcating the runner (manifold) in the mold into the foremost resin discharge port 4 and the rearmost resin discharge port 6 in the hot runner nozzle 1, an injection machine for feeding the molten resin for a surface layer of the molded article solely to the resin discharge port 4, an injection machine for feeding the molten resin for an intermediate layer of the molded article solely to the resin discharge port 5, and an injection machine for feeding the molten resin for a surface layer of the molded article solely to the resin discharge port 6 may be connected to the mold 8 so as to correspond to the foremost resin discharge port 4, the middle resin discharge port 5, and the rearmost resin discharge port 6, respectively. Then, flow rates of the molten resins to be fed into the resin discharge ports 4, 5, and 6 may be controlled by the injection machines corresponding to the resin discharge ports 4, 5, and 6, respectively.

Preliminary Assistance for Pushing-in of Intermediate Layer in Molding Final Stage In the above-described embodiment, the projection 13 is provided at the tip of the shut pin 2 and the molten resin a for a surface layer of the molded article in the nozzle gate 7 is pushed in toward the mold cavity 9 when the projection 13 enters the nozzle gate 7 as described above. Alternatively, when only the foremost resin discharge port 4 is being opened (FIG. 9), i.e., the final stage in forming a molded article, the molten resin (molten resin a for a surface layer of the molded article) with a resin pressure being applied by the operation of the injection machine 11 corresponding to the resin discharge port 4 may be fed into the shut pin hole 3, for example. This contributes to the pushing-in of the intermediate layer in the sprue portion before the pushing-in of the intermediate layer by the projection 13. This is therefore advantageous in further ensuring the pushing-in of the intermediate layer by the projection 13.

Screw Depressurization in Injection Machine Corresponding to Middle Resin Discharge Port in Molding Final Stage The final stage in forming a molded article starts after required amounts of the molten resin a for a surface layer of the molded article and the molten resin b for an intermediate layer of the molded article are fed into the mold cavity 9 from the resin discharge port 4, the resin discharge port 5, and the resin discharge port 6, respectively, and the resin pressures upon feeding are released by the operations of the injection machines 11 and 12 to stop the feeding of the resins into the shut pin hole 3 from the resin discharge port 4, the resin discharge port 5, and the resin discharge port 6. According to the above-described embodiment, the operation of stopping the feeding of the molten resins by moving the shut pin 2 forward to close the resin discharge ports 4, 5, and 6 while no molten resins are being fed into the shut pin hole 3 from the resin discharge ports 4, 5, and 6 is illustrated as an example of an operation in the final stage.

As described above, in the final stage in forming a molded article, the feeding of the resins into the shut pin hole 3 from the resin discharge ports 4, 5, and 6 is stopped by stopping the application of the resin pressures upon feeding from the injection machines. However, there is a case where a foamable material is used as a resin for forming the intermediate layer of a molded article. When such a foamable material is sent out from the injection machine corresponding to the middle resin discharge port 5 as the molten resin for an intermediate layer of the molded article, the molten resin may enter the shut pin hole 3 from the middle resin discharge port 5 depending on the conditions such as heat being applied to the hot runner nozzle 1 even after the resin pressure for feeding is released from the injection machine in the final stage in forming a molded article.

In view of this, a small amount of the molten resin a for a surface layer of the molded article present in the shut pin hole 3 is preferably caused to enter the middle resin discharge port 5 so as to push up the molten resin b for an intermediate layer of the molded article in the final stage in forming a molded article.

In order to achieve the above, once in the final stage in forming a molded article, the molten resin a for a surface layer of the molded article (in a small amount) is fed into the shut pin hole 3 from the foremost resin discharge port 4 and the rearmost resin discharge port 6 (or only from the foremost resin discharge port 4) by the operation of the injection machine and screw depressurization is performed in the injection machine for the molten resin b for an intermediate layer of the molded article corresponding to the resin discharge port 5 while keeping all of the resin discharge ports 4, 5, and 6 in an open state or keeping the foremost resin discharge port 4 and the middle resin discharge port 5 for sending out the molten resin b for an intermediate layer of the molded article in an open state by moving the shut pin 2 forward to close the rearmost resin discharge port 6.

As a result of this, the molten resin a for a surface layer of the molded article fed into the shut pin hole 3 from the resin discharge ports excluding the middle resin discharge port 5 pushes the molten resin b for an intermediate layer of the molded article in the middle resin discharge port 5. After such pushing, the shut pin 2 further moves forward to close the resin discharge ports 4 and 5. Then, the process of forming a molded article is ended.

Figure 11:
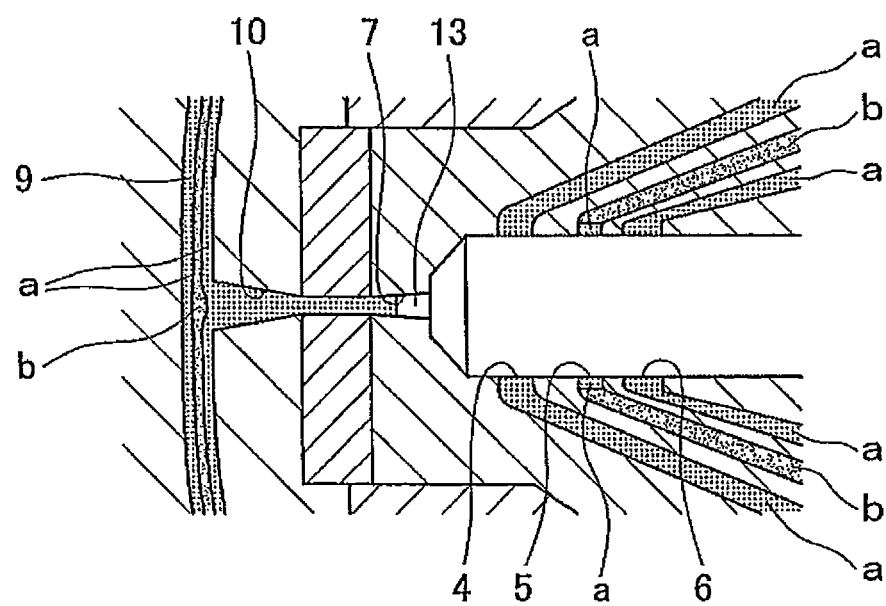
FIG. 11 is an explanatory cross-sectional view illustrating a state in which a molten resin for a surface layer of the molded article is fed into the middle resin discharge port and the middle resin discharge port is then closed by the shut pin.
Figure 12A:
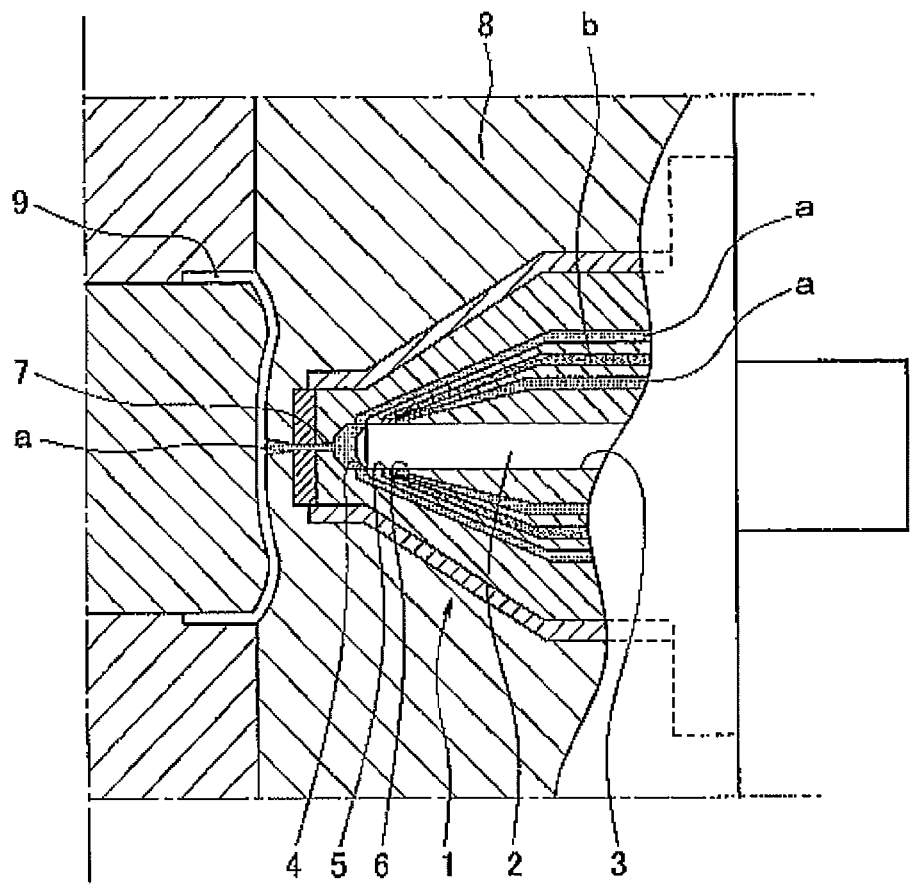
FIGS. 12A and 12B illustrate an example of a hot runner nozzle for forming a multi-layer molded article according to a conventional technique, FIG. 12A being an explanatory drawing illustrating a mold in a state where a foremost resin discharge port is opened, FIG. 12B being an explanatory drawing illustrating, in an enlarged manner, the state where the foremost resin discharge port is opened.
Figure 12B:
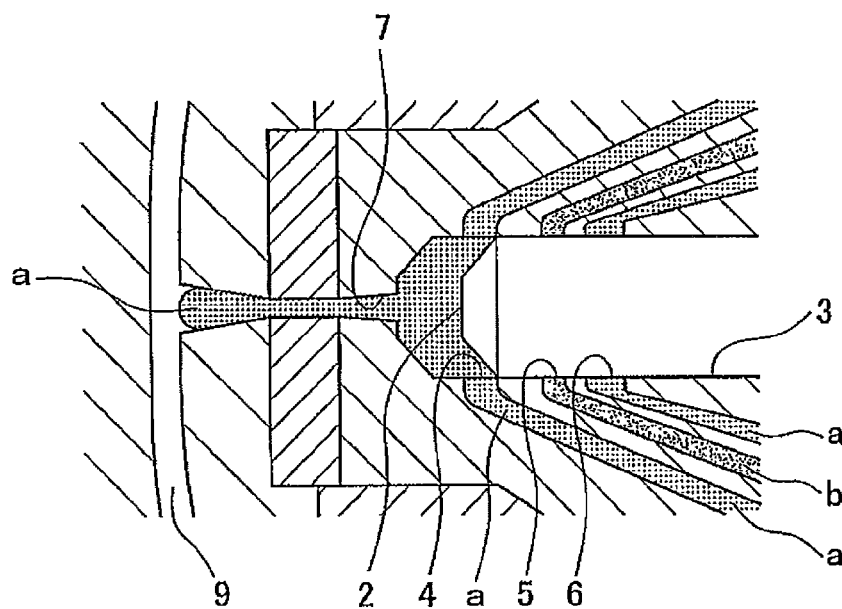
Figure 13A:
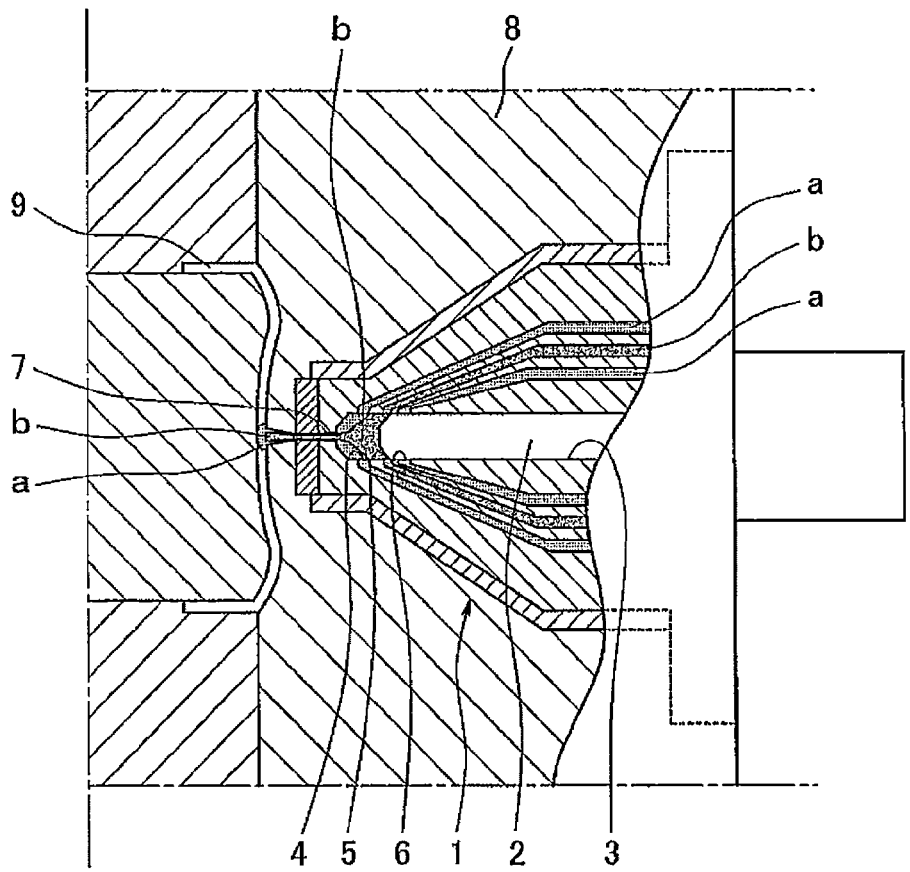
FIGS. 13A and 13B illustrate the example of the hot runner nozzle for forming a multi-layer molded article according to the conventional technique, FIG. 13A being an explanatory drawing illustrating the mold in a state where the foremost resin discharge port and a middle resin discharge port are opened, FIG. 13B being an explanatory drawing illustrating, in an enlarged manner, the state where the foremost resin discharge port and the middle resin discharge port are opened.
Figure 13B:
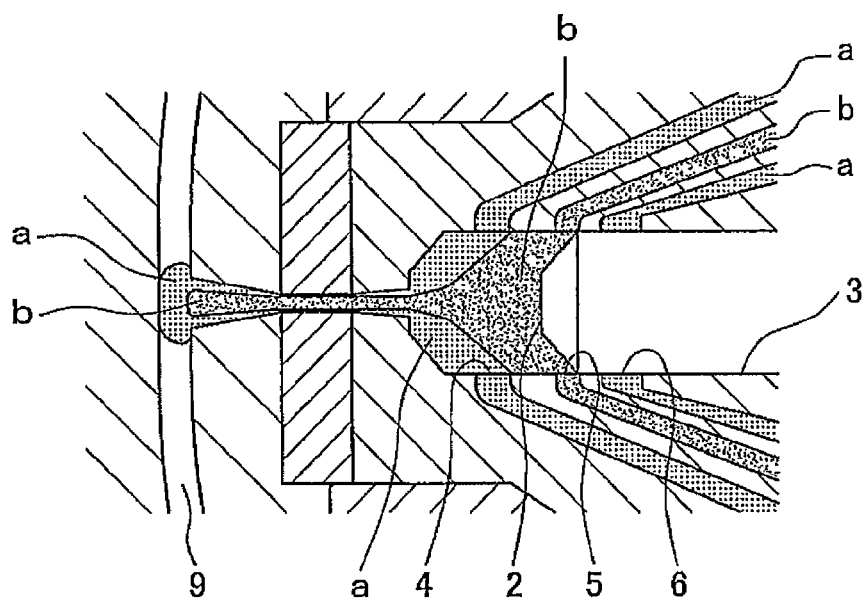
Figure 14A:
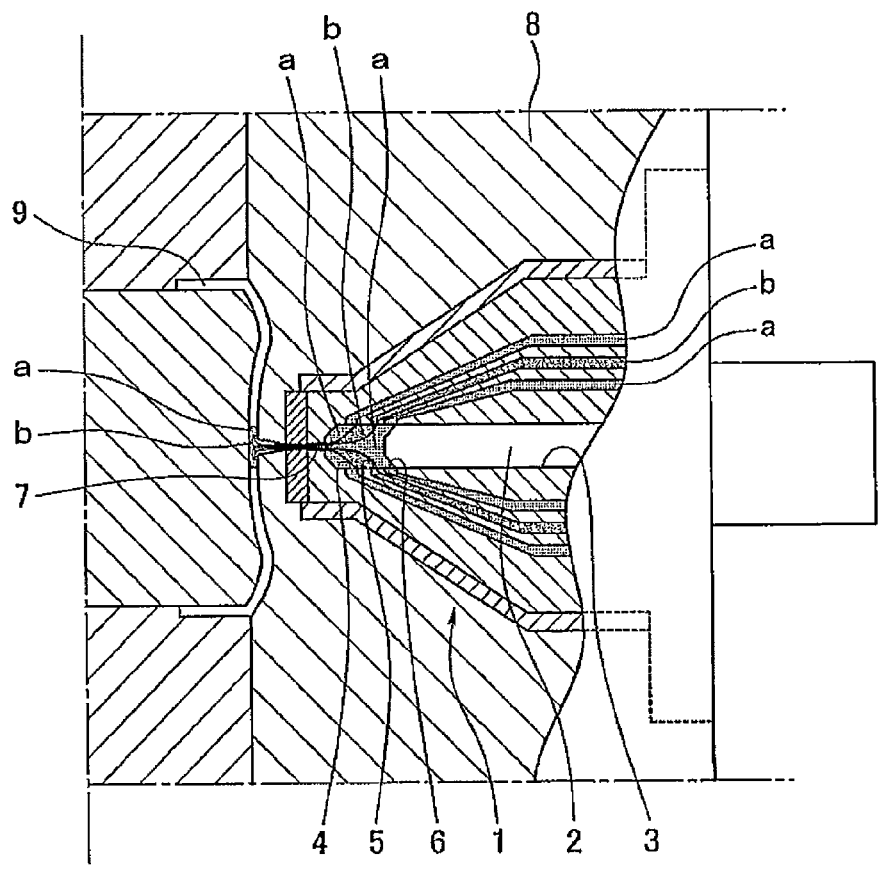
FIGS. 14A and 14B illustrate the example of the hot runner nozzle for forming a multi-layer molded article according to the conventional technique.
Figure 14B:
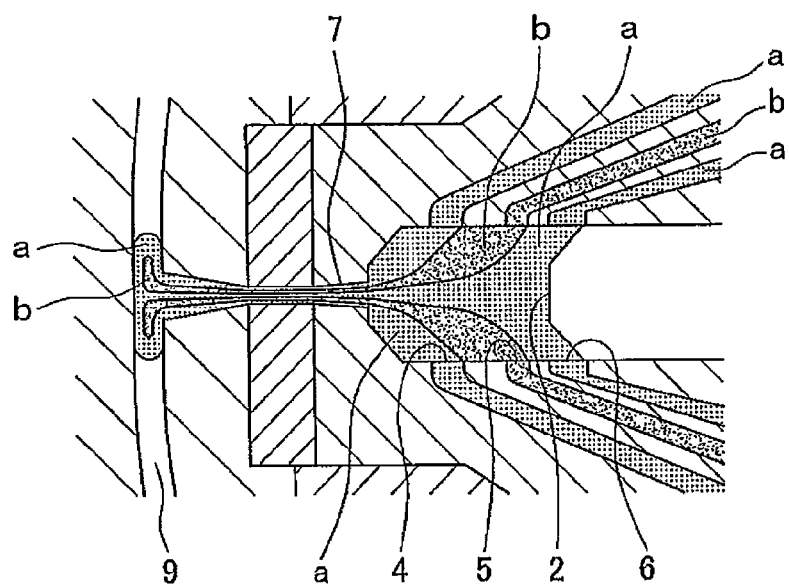
Figure 15A:
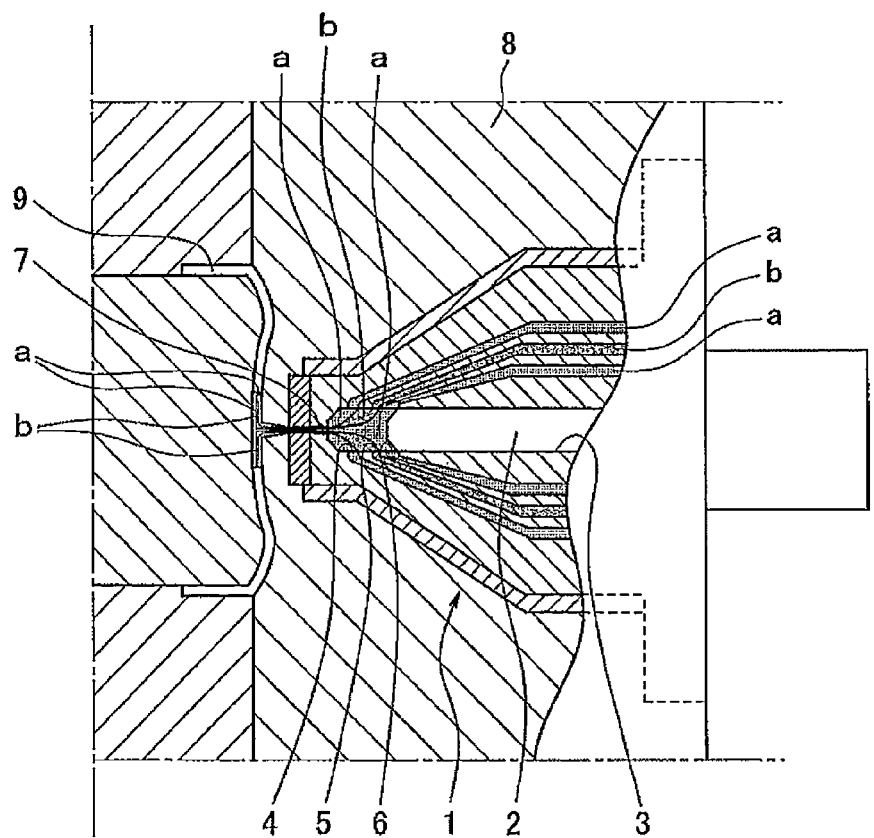
FIGS. 15A and 15B illustrate feeding of molten resins in the example of the hot runner nozzle for forming a multi-layer molded article according to the conventional technique, FIG. 15A being an explanatory drawing illustrating the mold in a state where all of the resin discharge ports are opened, FIG. 15B being an explanatory drawing illustrating, in an enlarged manner, the state where all of the resin discharge ports are opened.
Figure 15B:
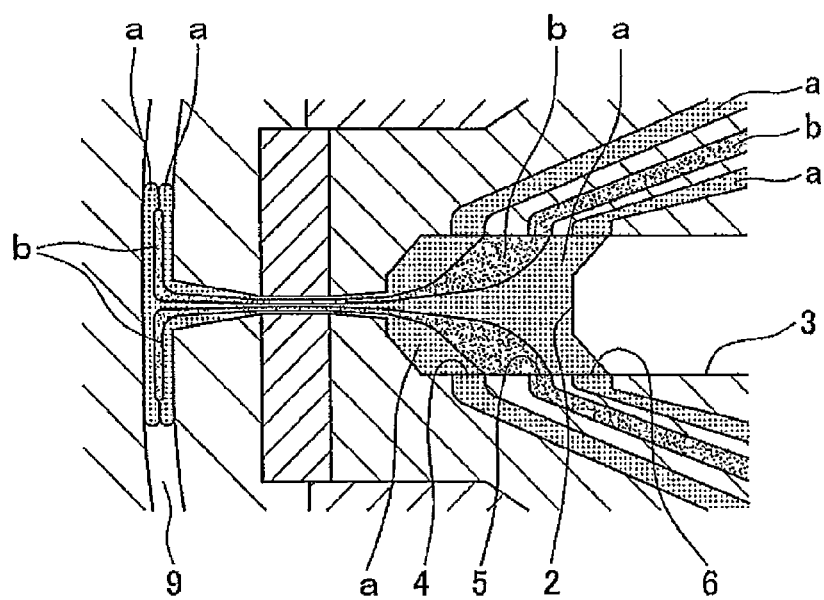

Until the next process of forming a molded article is started, the molten resin a for a surface layer of the molded article fed into the middle resin discharge port 5 from the shut pin hole 3 blocks the middle resin discharge port 5 while slightly pushing up the molten resin b for an intermediate layer of the molded article. In this state, the shut pin 2 closes the middle resin discharge port 5 (FIG. 11). This is effective in preventing the molten resin for an intermediate layer of the molded article from flowing into the shut pin hole 3 from the middle resin discharge port 5 in the final stage in forming a molded article.

Pressure Equalization Up to Resin Discharge Ports Before Feeding Resins

The above-described molding for a molded article having a three-layer structure configured with the use of two kinds of resins is performed repeatedly. According to the present injection molding machine, when the shut pin 2 moves backward to open the resin discharge ports 4, 5, and 6, which have been closed since the previous molding process, in order to feed the molten resins into the shut pin hole 3, the resin pressures of the molten resins to be fed are preferably constant in the repeated molding processes. It is possible to contrive ways to keep the resin pressures constant.

In the present injection molding machine configured to feed the molten resins to the mold 8 so as to form a molded article having a three-layer structure configured with the use of two kinds of resins, each of the injection machines 11 and 12 performs a pressure keeping operation after the molten resin a for a surface layer of the molded article and the molten resin b for an intermediate layer of the molded article are filled into the mold cavity 9 from the hot runner nozzle 1 as with the typical injection molding. According to the hot runner nozzle 1 in the mold 8 in the present injection molding machine, the resin discharge ports 4, 5, and 6 are all closed by the shut pin 2 after the pressure keeping operation is completed.

In order to keep the resin pressure of the molten resin to be fed constant, each of the injection machines 11 and 12 starts a measuring step at the timing when the resin discharge ports 4, 5, and 6 are all closed by the shut pin 2. After this measuring step is completed, the screw is moved forward with a predetermined pressure in each of the two injection machines 11 and 12. Thereafter, reverse depressurization is performed. This allows the resin pressures to be kept constant in the runners for the molten resins, which are the flow passages extending from the nozzle portions of the two injection machines 11 and 12 to the resin discharge ports 4, 5, and 6 (all in the closed state) in the hot runner nozzle 1. Thus, the molten resin for a surface layer of the molded article and the molten resin for an intermediate layer of the molded article are fed into the shut pin hole 3 under appropriate resin pressures and accordingly, each of the above-described molten resins is fed into the mold cavity 9 in an appropriate state. Thus, better molding can be performed repeatedly.

While the above-described embodiments describe the cases where the molded article having the three-layer structure configured with the use of the two kinds of resins is formed, the present invention is not limited to these embodiments. The present invention can be applied to a case where a multi-layer molded article is formed with the use of three or more kinds of resins. If a molded article having a five-layer structure configured with the use of three kinds of resins is formed, for example, such molding can be performed by changing the number of the resin discharge ports in the hot runner nozzle and the number of the injection machines for feeding the molten resins to the resin discharge ports.

In the above-described embodiments, each of the passage portions to reach the resin discharge ports in the hot runner nozzle is laid out in the concentric annular shape in the cross sectional plane in the nozzle diameter direction, the plurality of resin discharge ports are arranged along the length direction of the shut pin hole, and each of the resin discharge ports is opened in the circumferential direction of the shut pin hole. Note however that the present invention is not limited to this embodiment.

REFERENCE NUMERALS LIST 1 hot runner nozzle
2 shut pin
3 shut pin hole
4 foremost resin discharge port
5 middle resin discharge port
6 rearmost resin discharge port
7 nozzle gate
8 mold
9 mold cavity
10 sprue of mold
11, 12 injection machine
13 projection
14 detecting part of injection machine
15 controller
16 driving part for shut pin
a molten resin for a surface layer of a molded article
b molten resin for an intermediate layer of a molded article
A discharge port opening and closing mechanism part
B nozzle gate opening and closing mechanism part

What is claimed is:

1. A hot runner nozzle to be attached to a mold for forming a molded article having a layered structure, the hot runner nozzle comprising:
a nozzle gate;
a shut pin hole;
a shut pin moving back and forth through the shut pin hole; and
a plurality of resin discharge ports arranged in a length direction of the shut pin hole so that the plurality of resin discharge ports face the shut pin hole, molten resins from the resin discharge ports being joined in the shut pin hole, and the resin discharge ports being able to be opened and closed by the shut pin, wherein
the nozzle gate has a diameter smaller than a diameter of the shut pin hole,
the shut pin having a tip which includes a frustoconical end and a projection provided on the frustoconical end spaced from the edge of the frustoconical end so as to push out the molten resin in the nozzle gate toward a mold cavity in the mold when the shut pin moves forward to close all of the resin discharge ports,
the shut pin further include a discharge port opening and closing mechanism part for opening and closing the resin discharge ports and a nozzle gate opening and closing mechanism part configured of the projection for pushing out the molten resin in the nozzle gate, and
the discharge port opening and closing mechanism part and the nozzle gate opening and closing mechanism part have respective different diameters.

2. The hot runner nozzle according to claim 1, wherein
the resin discharge ports corresponding to which a circumferential surface of the shut pin is positioned are closed by the shut pin, and
when the shut pin moves backward so that the resin discharge port is positioned before the tip of the shut pin, the resin discharge port positioned before the tip of the shut pin is opened to be capable of sending out the molten resin.

3. The hot runner nozzle according to claim 1, comprising nozzle resin passages to reach the plurality of respective resin discharge ports, the nozzle resin passages each being arranged in a concentric annular shape in a cross sectional plane in a nozzle diameter direction, and wherein
each of the plurality of resin discharge ports is opened in a circumferential direction of the shut pin hole.

4. The hot runner nozzle according to claim 2, comprising nozzle resin passages to reach the plurality of respective resin discharge ports, the nozzle resin passages each being arranged in a concentric annular shape in a cross sectional plane in a nozzle diameter direction, and wherein
each of the plurality of resin discharge ports is opened in a circumferential direction of the shut pin hole.

5. A mold comprising the hot runner nozzle according to any one of claims 1 to 4, for forming a molded article having a layered structure with molten resins fed from the hot runner nozzle, wherein
the shut pin is switchable among three shut pin opening and closing states including:
a state in which the shut pin is positioned corresponding to the resin discharge ports other than a foremost resin discharge port to open only the foremost resin discharge port;
a state in which the shut pin is positioned behind a rearmost resin discharge port to open all of the resin discharge ports; and
a totally-closed state in which the shut pin closes all of the resin discharge ports.

6. A mold comprising the hot runner nozzle according to any one of claims 1 to 4, for forming a molded article having a layered structure with molten resins fed from the hot runner nozzle, wherein
the shut pin is switchable among four shut pin opening and closing states including:
a state in which the shut pin is positioned corresponding to the resin discharge ports other than a foremost resin discharge port to open only the foremost resin discharge port;
a state in which the shut pin is positioned corresponding to a rearmost resin discharge port to close only the rearmost resin discharge port and open the resin discharge ports other than the rearmost resin discharge port;
a state in which the shut pin is positioned behind the rearmost resin discharge port to open all of the resin discharge ports; and
a totally-closed state in which the shut pin closes all of the resin discharge ports.

7. A method for feeding molten resins to a mold, the method comprising:
attaching, to the mold for forming a multi-layer molded article according to claim 5, an injection machine for feeding a molten resin to a runner for a molten resin for a surface layer of the molded article in the mold and an injection machine for feeding a molten resin to a runner for a molten resin for an intermediate layer of the molded article in the mold; and
switching among the shut pin opening and closing states upon feeding the molten resins to the mold on the basis of a screw reached position or an injection time in the injection machine for feeding the molten resin for a surface layer of the molded article and the injection machine for feeding the molten resin for an intermediate layer of the molded article.

8. A method for feeding molten resins to a mold, the method comprising:
attaching, to the mold for forming a multi-layer molded article according to claim 6, an injection machine for feeding a molten resin to a runner for a molten resin for a surface layer of the molded article in the mold and an injection machine for feeding a molten resin to a runner for a molten resin for an intermediate layer of the molded article in the mold; and
switching among the shut pin opening and closing states upon feeding the molten resins to the mold on the basis of a screw reached position or an injection time in the injection machine for feeding the molten resin for a surface layer of the molded article and the injection machine for feeding the molten resin for an intermediate layer of the molded article.

9. A method for feeding molten resins to a mold, the method comprising:
upon feeding molten resins to a mold, provided with the hot runner nozzle according to any one of claims 1 to 4, for forming a molded article having a layered structure with the molten resins fed from the hot runner nozzle, using the foremost resin discharge port and the rearmost resin discharge port in the hot runner nozzle as resin discharge ports into which the same molten resin is separated and fed and using the middle resin discharge port as a resin discharge port into which a molten resin of a kind different from the molten resin fed into the foremost resin discharge port and the rearmost resin discharge port is fed;
setting a resin flow rate of the same molten resin to be separated into the foremost resin discharge port to be different from a resin flow rate of the same molten resin to be separated into the rearmost resin discharge port by adjusting runner bores after the molten resin is separated or throttles; and
feeding the same molten resin to the mold cavity with the resin flow rate from the foremost resin discharge port into the mold cavity in the mold and the resin flow rate from the rearmost resin discharge port into the mold cavity being different from each other.

10. A method for feeding molten resins to a mold, the method comprising:
upon feeding molten resins to a mold, provided with the hot runner nozzle according to any one of claims 1 to 4, for forming a molded article having a layered structure with the molten resins fed from the hot runner nozzle, using the resin discharge ports of the hot runner nozzle as resin discharge ports into which the molten resins are fed from independent injection machines; and
controlling resin flow rates of the molten resins to be fed into the resin discharge ports respectively by the injection machines corresponding to the resin discharge ports.

11. A method for feeding molten resins to a mold, the method comprising:
upon feeding molten resins to a mold, provided with the hot runner nozzle according to any one of claims 1 to 4, for forming a molded article having a layered structure with the molten resins fed from the hot runner nozzle, performing a final stage in forming a molded article by feeding the molten resin only from the foremost resin discharge port.

12. A method for feeding molten resins to a mold, the method comprising:
attaching, to a mold, provided with the hot runner nozzle according to any one of claims 1 to 4, for forming a multi-layer molded article, an injection machine for feeding a molten resin to a runner for a molten resin for a surface layer of the molded article in the mold and an injection machine for feeding a molten resin to a runner for a molten resin for an intermediate layer of the molded article in the mold;
upon feeding the molten resins to the mold, sending out the molten resin from the foremost resin discharge port while keeping all of the resin discharge ports or the foremost resin discharge port and the resin discharge port for sending out the molten resin for an intermediate layer of the molded article in an opened state in a final stage in a process of forming a molded article and performing screw depressurization in the injection machine corresponding to the resin discharge port for the molten resin for an intermediate layer of the molded article so as to push the molten resin fed into the shut pin hole from the resin discharge port other than the resin discharge port for the molten resin for an intermediate layer of the molded article into the resin discharge port for the molten resin for an intermediate layer of the molded article;

ending the process of forming a molded article after the pushing-in; and closing the resin discharge port for the molten resin for an intermediate layer of the molded article by the shut pin with the molten resin fed into the shut pin hole from the resin discharge port other than the resin discharge port for the molten resin for an intermediate layer of the molded article being pushed thereinto until a next process of forming a molded article is started.

13. A method for molding multilayers, the method comprising:

attaching, to a mold, provided with the hot runner nozzle according to any one of claims 1 to 4, for forming a multi-layer molded article, an injection machine for feeding a molten resin to a runner for a molten resin for a surface layer of the molded article in the mold and an injection machine for feeding a molten resin to a runner for a molten resin for an intermediate layer of the molded article in the mold;

upon forming a molded article by feeding the molten resins to the mold, closing all of the resin discharge ports in the hot runner nozzle by the shut pin after performing a pressure keeping operation in the injection machines for feeding the molten resins to the resin discharge ports;

performing a measuring step in each of the injection machines; and causing screws in all of the injection machines to move forward with a predetermined pressure after the measuring step is ended and thereafter performing reverse depressurization to keep a pressure in each of the runners for the molten resins from the injection machines to the hot runner nozzle constant.

* * * * *